(12) United States Patent
Park et al.

(10) Patent No.: US 9,484,768 B2
(45) Date of Patent: Nov. 1, 2016

(54) COMPLEX DEVICE AND ELECTRONIC DEVICE HAVING THE SAME

(71) Applicant: INNOCHIPS TECHNOLOGY CO., LTD., Ansan-Si, Gyeonggi-Do (KR)

(72) Inventors: In Kil Park, Seongnam-Si (KR); Tae Hyung Noh, Siheung-Si (KR); Sung Cheol Park, Ansan-Si (KR); Young Sul Kim, Seoul (KR); Soon Dong Choi, Siheung-Si (KR); In Seob Jung, Ansan-Si (KR); Wan Park, Ansan-Si (KR); Hee Seob Shin, Suwon-Si (KR)

(73) Assignee: INNOCHIPS TECHNOLOGY CO., LTD. (KR)

( * ) Notice: Subject to any disclaimer, the term of this patent is extended or adjusted under 35 U.S.C. 154(b) by 0 days.

(21) Appl. No.: 14/530,653

(22) Filed: Oct. 31, 2014

(65) Prior Publication Data

US 2015/0126112 A1 May 7, 2015

(30) Foreign Application Priority Data

Nov. 1, 2013 (KR) .................. 10-2013-0131938
Jun. 13, 2014 (KR) .................. 10-2014-0072031

(51) Int. Cl.
| | |
|---|---|
| H04W 4/00 | (2009.01) |
| H02J 7/02 | (2016.01) |
| H02J 7/00 | (2006.01) |
| B06B 1/06 | (2006.01) |
| H04M 1/02 | (2006.01) |
| H04M 1/18 | (2006.01) |
| H04M 1/725 | (2006.01) |

(52) U.S. Cl.
CPC ............... *H02J 7/025* (2013.01); *B06B 1/06* (2013.01); *H02J 7/00* (2013.01); *H04M 1/026* (2013.01); *H04W 4/008* (2013.01); *H04M 1/185* (2013.01); *H04M 1/72575* (2013.01); *H04M 2250/04* (2013.01); *H04R 2217/00* (2013.01)

(58) Field of Classification Search
None
See application file for complete search history.

(56) References Cited

U.S. PATENT DOCUMENTS

| | | | |
|---|---|---|---|
| 7,099,710 | B1 | 8/2006 | Faillance |
| 8,028,794 | B1 | 10/2011 | Freeman |
| 8,066,095 | B1 | 11/2011 | Bromer |
| 8,256,568 | B2 | 9/2012 | Lin |
| 8,315,417 | B2 | 11/2012 | Basore |
| 8,320,597 | B2 | 11/2012 | Griffin et al. |
| 8,327,974 | B1 | 12/2012 | Smith et al. |
| 8,412,289 | B1 | 4/2013 | Oh |
| 8,944,209 | B1 | 2/2015 | Fields |

(Continued)

FOREIGN PATENT DOCUMENTS

| | | |
|---|---|---|
| CN | 102882545 B | 1/2013 |
| CN | 103248990 A | 8/2013 |

(Continued)

OTHER PUBLICATIONS

Naver blog (Resonating Speaker, http://blog.naver.com/nakkkssun/130169127029, May 29, 2013).

*Primary Examiner* — Alejandro Rivero

(57) ABSTRACT

Provided are a complex device including a piezoelectric device, a wire patch cell (WPC) antenna disposed on one surface of the piezoelectric device, the WPC antenna being connected to two antenna patterns that are vertically spaced apart from each other, and a near field communication (NFC) antenna disposed outside the WPC antenna and an electronic device having the same.

22 Claims, 13 Drawing Sheets

(56) References Cited

U.S. PATENT DOCUMENTS

| | | |
|---|---|---|
| 2007/0223745 A1 | 9/2007 | Feng et al. |
| 2010/0183179 A1 | 7/2010 | Griffin et al. |
| 2010/0189294 A1 | 7/2010 | Basore |
| 2011/0038495 A1 | 2/2011 | Jeong et al. |
| 2011/0050164 A1 | 3/2011 | Partovi et al. |
| 2011/0101788 A1* | 5/2011 | Sun .................. H01F 38/14 307/104 |
| 2013/0088130 A1 | 4/2013 | Rayner |
| 2013/0267170 A1* | 10/2013 | Chong ................ H04B 1/3833 455/41.1 |

FOREIGN PATENT DOCUMENTS

| | | |
|---|---|---|
| CN | 204031420 U | 12/2014 |
| JP | 60124197 | 8/1985 |
| JP | U255794 | 4/1990 |
| JP | 3035131 | 12/1996 |
| JP | 11219834 | 8/1999 |
| JP | 2002232542 | 8/2002 |
| JP | 20036592 | 1/2003 |
| JP | 2003347467 | 12/2003 |
| JP | 2004364199 | 12/2004 |
| JP | 200529236 | 2/2005 |
| JP | 2007110656 | 4/2007 |
| JP | 2007143154 A | 6/2007 |
| KR | 20430436 | 11/2006 |
| KR | 2007100611 | 10/2007 |
| KR | 201263412 | 6/2012 |
| KR | 101198961 | 11/2012 |
| TW | M462033 U1 | 9/2013 |
| WO | 2013126216 A1 | 8/2013 |

\* cited by examiner

COMPLEX DEVICE AND ELECTRONIC DEVICE HAVING THE SAME

CROSS-REFERENCE TO RELATED APPLICATION

This application claims priority to Korean Patent Application Nos. 10-2013-0131938, 10-2014-0072031 filed on Nov. 1, 2013 & Jun. 13, 2014 and all the benefits accruing therefrom under 35 U.S.C. §119, the contents of which are incorporated by reference in their entirety.

BACKGROUND

The present disclosure relates to a complex device, and more particularly, to a complex device that includes a piezoelectric speaker to integrate multi-functions in one module and an electronic device having the same.

Compact portable electronic devices that are capable of being used by a user while being portable are being more emphasized in miniaturization, slimness, and lightweight. Also, multipurpose functions that are used in various multimedia environments or the Internet environments as well as simple communication functions may be added to the electronic devices. Thus, the electronic devices are being widely used as so-called smartphones. Particularly, such a smartphone includes a wider screen so as to be more adequately used in the multimedia environments. Here, for user's convenience, a touch screen that operates in a touch manner is generally adopted for the screen. Also, payment methods using near field communication (NFC) in portable electronic devices are coming into wide use. In recent years, portable electronic devices to which wireless power charge (WPC) methods using electromagnetic induction in place of cable charge methods are adopted are being released.

Such a portable electronic device capable of playing multimedia sources may not include an own speaker due to the miniaturization thereof or may include a mono speaker for providing the least sound so as to reduce power consumption even though the portable electronic device includes the speaker. Thus, to allow a user to appreciate multimedia sources to be played in stereophonic sound, a separate speaker has to be connected to the portable electronic device.

However, since the typical speaker has a large volume, it is difficult to allow the user to carry the speaker. That is, the existing speaker needs a diaphragm. Also, the more the diaphragm increases in size, the more the sound increases in amplification. Since sound quality due to vibration is influenced by a magnitude and size of a permanent magnet for vibrating the diaphragm, the portable speaker increases in volume. Also, since a separate connection line is necessary to connect the typical speaker to the portable electronic device, and a power has to be supplied into the portable electronic device, it is necessary to carry a speaker body to the connection line at the same time. In addition, the speaker may be used at only a place at which a power is supplied.

Korean Patent Registration No. 10-119861 discloses a speaker for a smartphone in which a separate power is not required.

SUMMARY

The present disclosure provides a complex device including a piezoelectric speaker, which has a small size and is easy to carry, to integrate multi-functions in one module and an electronic device having the same.

The present disclosure also provides a complex device that is capable of being coupled to and separated from a portable electronic device and an electronic device having the same.

In accordance with an exemplary embodiment, a complex device includes: a piezoelectric device; a wireless power charge (WPC) antenna disposed on one surface of the piezoelectric device, the WPC antenna being connected to two antenna patterns that are vertically spaced apart from each other; and a near field communication (NFC) antenna disposed outside the WPC antenna.

The complex device may further include a vibration transfer body contacting at least one area of a stacked structure in which the piezoelectric device, the WPC antenna, and the NFC antenna are stacked, the vibration transfer body being disposed to be spaced apart form one surface of the stacked structure.

The WPC antenna may include a first WPC antenna pattern disposed on a first sheet that is provided on one surface of the piezoelectric device and a second WPC antenna pattern disposed on a second sheet that is provided on the first sheet.

The complex device may further include: a first connection hole defined in the second sheet to connect the first and second WPC antennas to each other; and a first withdrawal pattern disposed on the first sheet, the first withdrawal pattern being connected to the first WPC antenna and withdrawn to the outside.

The NFC antenna may be disposed on the second sheet outside the second WPC antenna, and at least one portion of the NFC antenna may be cut.

The complex device may further include: at least one connection pattern disposed on the first sheet; at least one second connection hole defined in the second sheet to connect the NFC antenna to the connection pattern; and a second withdrawal pattern disposed on the first sheet, the second withdrawal pattern being connected to the NFC antenna and withdrawn to the outside.

The first sheet may include a magnetic sheet, and the second sheet comprises a nonmagnetic sheet.

The piezoelectric device and the first and second sheets may be co-fired.

Each of the first and second sheets may be formed of a polymer.

The complex device may further include a cover sheet disposed on the second sheet and a magnetic sheet spaced apart from the other surface of the piezoelectric device.

The complex device may further include: a frame configured to fasten an edge of the stacked structure comprising the first and second sheets; and a cover disposed on at least one side of the frame.

In accordance with another exemplary embodiment, a complex device includes: a body separably coupled to a rear surface of an electronic device; and a complex device module coupled to a predetermined area of the body, wherein the complex device module is constituted by a piezoelectric speaker, a WPC antenna, and an NFC antenna, which are coupled to each other.

The complex device module may include: a piezoelectric device; the WPC antenna disposed on one surface of the piezoelectric device, the WPC antenna being connected to two antenna patterns that are vertically spaced apart from each other; and the NFC antenna disposed outside the WPC antenna.

The complex device may further include a vibration transfer body contacting at least one area of a stacked structure in which the piezoelectric device, the WPC antenna, and the NFC antenna are stacked, the vibration transfer body being disposed to be spaced apart form one surface of the stacked structure.

The WPC antenna may include: a first WPC antenna pattern disposed on a first sheet that is provided on one surface of the piezoelectric device; a second WPC antenna pattern disposed on a second sheet that is provided on the first sheet; a first connection hole defined in the second sheet to connect the first and second WPC antennas to each other; and a first withdrawal pattern disposed on the first sheet, the first withdrawal pattern being connected to the first WPC antenna and withdrawn to the outside.

The NFC antenna may include: an NFC antenna pattern disposed on the second sheet outside the second WPC antenna and of which at least one portion is cut; at least one connection pattern disposed on the first sheet; at least one second connection hole defined in the second sheet to connect the NFC antenna to the connection pattern; and a second withdrawal pattern disposed on the first sheet, the second withdrawal pattern being connected to the NFC antenna and withdrawn to the outside.

The first sheet may include a magnetic sheet, and the second sheet comprises a nonmagnetic sheet, and the piezoelectric device and the first and second sheets may be co-fired.

Each of the first and second sheets may be formed of a polymer, and the complex device may further include a cover sheet disposed on the second sheet and a magnetic sheet spaced apart from the other surface of the piezoelectric device.

The body may have the same shape as a rear cover of the electronic device and be coupled after the rear cover of the electronic device is separated.

An opening may be defined in a predetermined area of the body, and the complex device module may be inserted into the opening.

The body may have a predetermined area that protrudes outward to define an accommodation space therein so that the complex device module is inserted into the accommodation space.

The complex device module may include: a first connection terminal having one side connected to the piezoelectric device and the other side exposed to the outside, the first connection terminal being connected to a sound output terminal disposed on a rear surface of the electronic device; and a second connection terminal having one side connected to the WPC antenna and the NFC antenna and the other side exposed to the outside, the second connection terminal being connected to a WPC terminal and NFC terminal that are disposed on the rear surface of the electronic device.

The complex device may further include a flip cover disposed on one side surface of the body to cover a front surface of the electronic device.

In accordance with yet another exemplary embodiment, an electronic device to which a complex device module is coupled to a rear surface thereof includes: a body separably coupled to the rear surface of the electronic device; and a complex device module coupled to a predetermined area of the body, wherein the complex device module is constituted by a piezoelectric speaker, a WPC antenna, and an NFC antenna, which are coupled to each other.

The complex device module may include: a piezoelectric device; the WPC antenna disposed on one surface of the piezoelectric device, the WPC antenna being connected to two antenna patterns that are vertically spaced apart from each other; the NFC antenna disposed outside the WPC antenna; and a vibration transfer body contacting at least one area of a stacked structure in which the piezoelectric device, the WPC antenna, and the NFC antenna are stacked, the vibration transfer body being disposed to be spaced apart form one surface of the stacked structure.

The vibration transfer body may be away from or close to the piezoelectric device from an edge thereof toward a central portion thereof or be maintained at the distance with respect to the piezoelectric device.

The vibration transfer body of the complex device module may contact a vibration amplification object to amplify a sound pressure and output that are outputted from the piezoelectric speaker.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

Figure 1:
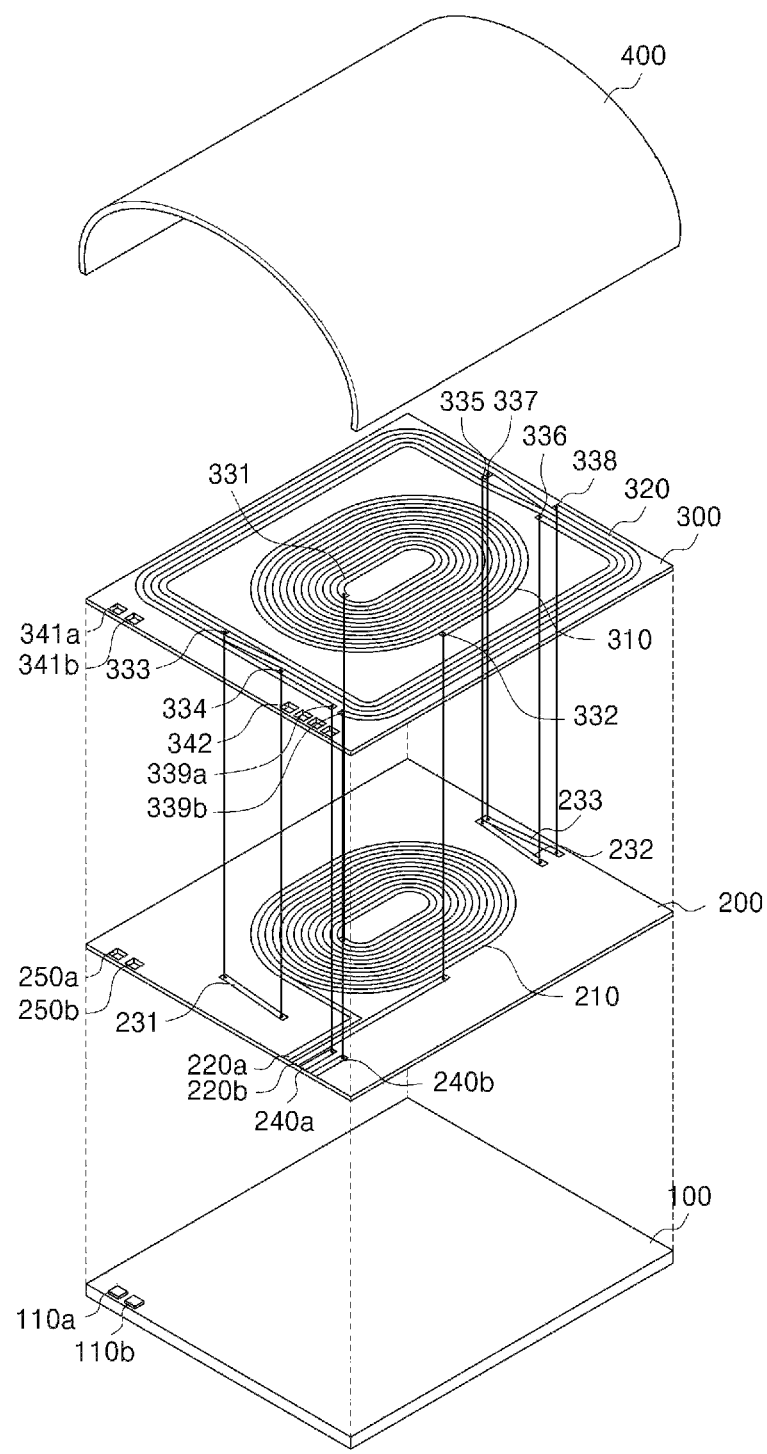
FIGS. 1 to 3 are schematic views of a complex device module in accordance with an exemplary embodiment.
Figure 2:
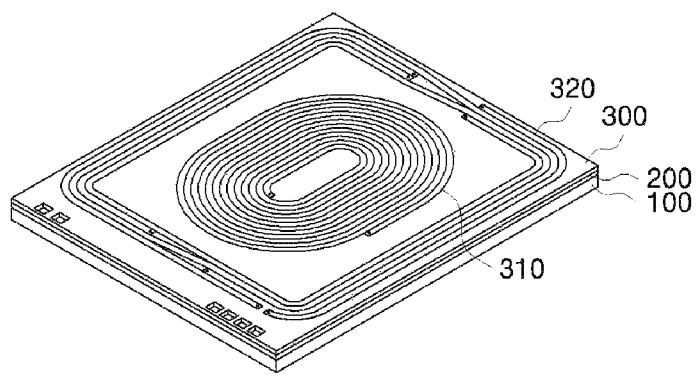
Figure 3:
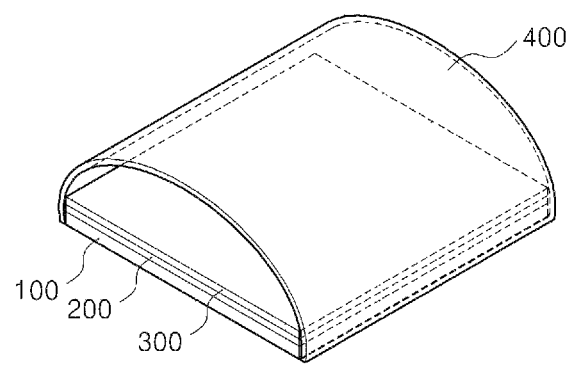

FIGS. 1 to 3 are schematic views of a complex device module in accordance with an exemplary embodiment. Here, FIG. 1 is an exploded perspective view of the complex device module, and FIGS. 2 and 3 are perspective views illustrating a coupled state of the complex device module. That is, FIG. 2 is a perspective view illustrating a partially coupled state of the complex device module, and FIG. 3 is a perspective view illustrating a completely coupled state of the complex device module.

Referring to FIGS. 1 to 3, a complex device module in accordance with an exemplary embodiment may include a piezoelectric device 100, a first sheet 200 disposed on one surface of the piezoelectric device 100 and having a first antenna pattern 210, and a second sheet 300 disposed on the first sheet 200 and having a second antenna pattern 310 and a third antenna pattern 320. Also, the complex device module may include a vibration transfer plate 400 that is a vibration transfer body and spaced apart from one surface of the piezoelectric device 100 from at least two side surfaces of at least the piezoelectric device 100. That is, the vibration transfer plate 400 may contact two side surfaces of the piezoelectric device 100. In detail, the vibration transfer plate 400 may contact two side surface of a stacked structure in which the piezoelectric device 100 and the first and second sheets 200 and 300 are stacked. Here, the first antenna pattern 210 of the first sheet 200 and the second antenna pattern 310 of the second sheet 300 are connected to each other to constitute a wireless power charge (WPC) antenna. The third antenna pattern 320 of the second sheet 300 may be disposed outside the second antenna pattern 310 to constitute a near field communication (NFC) antenna. Also, the piezoelectric device 100 and the vibration transfer plate 400 may constitute a piezoelectric speaker. A sound may be amplified in space between the piezoelectric device 100 and the vibration transfer plate 400 and then be outputted. Thus, the complex device module in accordance with an exemplary embodiment may be manufactured by integrating the piezoelectric speaker, the WPC antenna, and the NFC antenna and by simultaneously plasticizing the piezoelectric device 100, the first sheet 200, and the second sheet 300.

The piezoelectric device 100 may have a rectangular plate shape having a predetermined thickness. That is, the piezoelectric device 100 has two surfaces facing each other, i.e., a top surface and a bottom surface. Also, the piezoelectric device 100 may have four side surfaces along edges of the top and bottom surfaces. Alternatively, the piezoelectric device 100 may have various shapes such as a square shape, a circular shape, an oval shape, a polygonal shape, and the like in addition to the rectangular shape. The piezoelectric device 100 may include a board and a piezoelectric layer disposed on at least one surface of the board. For example, the piezoelectric device 100 may be provided as a bimorph type piezoelectric device in which the piezoelectric layer is formed on both surfaces of the board or a unimorph type piezoelectric device in which the piezoelectric layer is formed on one surface of the board. At least one layer may be stacked to form the piezoelectric layer. Preferably, a plurality of layers may be stacked on each other to form the piezoelectric layer. Also, an electrode may be disposed on each of upper and lower portions of the piezoelectric layer. Here, the piezoelectric layer may be formed of, for example, a PZT(Pb, Zr, Ti), NKN(Na, K, Nb), or BNT(Bi, Na, Ti)-based piezoelectric material. Also, the piezoelectric layer may be polarized in different directions and then be stacked on each other. That is, when the plurality of piezoelectric layers are formed on one surface of the board, the polarizations of each of the piezoelectric layers may be alternately disposed in the different directions. The board may be formed of a material having a property in which vibration is generated while maintaining the structure in which the piezoelectric layers are stacked, for example, a metal or plastic. However, the piezoelectric device 100 may not use the board that is formed of a material that is different from that of the piezoelectric layer. That is, the piezoelectric layer that is not polarized may be disposed on a central portion of the piezoelectric device 100, and the plurality of piezoelectric layers that are polarized in directions different from each other may be disposed on the upper and lower portions of the piezoelectric device 100. Electrode patterns 110*a* and 110*b* to which a driving voltage is applied may be disposed on a predetermined area of one short side of the piezoelectric device 100. The electrode patterns 110*a* and 110*b* may be connected to a connection terminal (not shown) and then be connected to the electronic device 10 through the connection terminal.

The first sheet 200 is disposed on one surface of the piezoelectric device 100, and the first antenna pattern 210 is disposed on the first sheet 200. Also, first and second withdrawal patterns 220*a* and 220*b* connected to the first antenna pattern 210 and then withdrawn to the outside, a plurality of connection patterns 231, 232, and 233 connecting the third antenna pattern 320 disposed on the second sheet 300, and third and fourth withdrawal patterns 240*a* and 240*b* connected to the third antenna pattern 320 and then withdrawn to the outside may be disposed on the sheet 200. The first sheet 200 may have the same shape as the piezoelectric device 100. That is, the first sheet 200 may have an approximately rectangular plate shape. Here, the first sheet 200 may have the same thickness as the piezoelectric device 100 or have a thickness different from that of the piezoelectric device 100. The first antenna pattern 210 may rotate in one direction from a central portion of the first sheet 200. Thus, the first antenna pattern 210 may have a predetermined turn number. For example, the first antenna pattern 210 may have a predetermined width and distance and a spiral shape that rotates outward in a counterclockwise direction. Here, the first antenna pattern 210 may have a line width and distance which are the same or have a line width and distance which are different from each other. That is, the first antenna pattern 210 may have a line width greater than a distance therebetween. Also, the first antenna pattern 210 has an end connected to the first withdrawal pattern 220*a*. The first withdrawal pattern 220*a* has a predetermined width and is exposed to one side of the first sheet 200. For example, the first withdrawal pattern 220*a* extends in a direction of a long side of the first sheet 200 and is exposed to one short side of the first sheet 200. That is, the first withdrawal pattern 220*a* is exposed to a side on which the electrode patterns 110*a* and 110*b* of the piezoelectric device 100 are disposed. Here, the first withdrawal pattern 220*a* may be spaced apart from the electrode patterns 110*a* and 110*b*. Also, the second withdrawal pattern 220*b* is spaced apart from the first withdrawal pattern 220*a* and is disposed in the same direction as the first withdrawal pattern 220*a*. The second withdrawal pattern 220*b* is connected to the second antenna pattern 310 disposed on the second sheet 200. Here, the second withdrawal pattern 220*b* may be longer than the first withdrawal pattern 220*a*. Also, the plurality of connection patterns 231, 232, and 233 may be provided to connect the third antenna pattern 320 disposed on the second sheet 300. That is, the third antenna pattern 320 may have, for example, a semicircular shape that is cut into at least two areas. Here, to connect the cut areas to each other, a plurality of connection patterns 321, 322, and 323 may be disposed on the first sheet 200. The connection pattern 321 may have a predetermined width and length in one short side direction on an area between the electrode patterns 110*a* and 110*b* of the piezoelectric device 100 and the first withdrawal pattern 220*a*. The connection patterns 322 and 323 are disposed on positions that face the connection pattern 321 in a long side direction, i.e., the other side on which the first and second withdrawal patterns 220*a* and 220*b* are not disposed. Also, each of the connection patterns 322 and 323 is not exposed to the other short side and has a predetermined width and length along the other short side. Also, the connection patterns 322 and 323 are spaced apart from each other. Also, the third and fourth withdrawal patterns 240*a* and 240*b* are spaced apart from the second withdrawal pattern 220*b* and exposed to one short side. Through-holes 250*a* and 250*b* that are spaced apart from each other are defined in areas of one side, on which the withdrawal patterns 220 and 240 are not disposed, the areas on which the withdrawal patterns 220 and 240 are disposed, i.e., areas corresponding to the electrode patterns 110*a* and 110*b* of the piezoelectric device 100, respectively.

Also, the withdrawal patterns 220 and 240 may be connected to a connection terminal (not shown) and then be connected to the electronic device 10 through the connection terminal. The first sheet 200 may be formed of magnetic ceramic. For example, the first sheet 200 may be formed by using a NiZnCu or NiZn-based magnetic material. Particularly, $Fe_2O_3$, ZnO, NiO, and CuO as magnetic materials may be mixed with the NiZnCu-based magnetic sheet. Here, $Fe_2O_3$, ZnO, NiO, and CuO may be mixed at a ratio of 5:2:2:1. Since the first sheet 200 is formed of the magnetic ceramic, electromagnetic waves generated from the WPC antenna and the NFC antenna may be shielded or absorbed to restrict an interference with the electromagnetic waves.

The second sheet 300 is disposed on the first sheet 200, and the second and third antenna patterns 310 and 320 are disposed on the second sheet 300 in a state where the second and third antenna patterns 310 and 320 are spaced apart from each other. Also, a plurality of holes 331, 332, 333, 334, 335, 336, 337, and 338 are defined in the second sheet 300. The second sheet 300 may have the same shape as that of each of the piezoelectric device 100 and the first sheet 200. That is, the second sheet 300 may have an approximately rectangular plate shape. Here, the second sheet 300 may have the same thickness as each of the piezoelectric device 100 and the first sheet 200 or have a thickness different from that of each of the piezoelectric device 100 and the first sheet 200. That is, the second sheet 300 may have a thickness less than that of the piezoelectric device 100 and equal to that of the first sheet 300. The second antenna pattern 310 may rotate in one direction from a central portion of the second sheet 300. Thus, the second antenna pattern 210 may have a predetermined turn number. For example, the second antenna pattern 310 may have a predetermined width and distance and a spiral shape that rotates outward in a clockwise direction. That is, the second antenna pattern 310 may have a spiral shape that rotates from the same area as the first antenna pattern 210 disposed on the first sheet 200 in the clockwise direction. Also, the second antenna pattern 310 may be formed up to an area that overlaps the second withdrawal pattern 220b disposed on the first sheet 200. Here, the second antenna pattern 310 may have the same line width and distance as those of the first antenna pattern 210, and the second antenna pattern 310 and the first antenna pattern 210 may overlap each other. The holes 331 and 332 are defined in a starting point and ending point of the second antenna pattern 310, respectively. A conductive material is filled into the holes 331 and 332. Thus, the starting point of the second antenna pattern 310 may be connected to a starting point of the first antenna pattern 210 through the hole 331, and the ending point of the second antenna pattern 310 may be connected to a predetermined area of the second withdrawal pattern 220 through the hole 332. The third antenna pattern 320 is spaced apart from the second antenna pattern and has a plurality of turn numbers along an edge of the second sheet 300. That is, the third antenna pattern 320 may disposed outside the second antenna pattern 310 to surround the second antenna pattern 310. Here, the third antenna pattern has a shape in which a predetermined area on the second sheet 30 is cut. That is, the third antenna pattern 320 may not have a plurality of turn numbers that are connected to each other, but have a shape that is cut into at least two areas which are not electrically connected to each other on the second sheet 300. The plurality of holes 333, 334, 335, 336, 337, and 338 are defined between the cut third antenna patterns 320. Also, the plurality of holes 333, 334, 335, 336, 337, and 338 are filled with a conductive material and thus electrically connected to the connection patterns 231, 232, and 233 of the first sheet 200. Thus, although the third antenna pattern 320 is cut into at least two areas, the cut third antenna patterns 320 may be electrically connected to each other through the plurality of holes 333, 334, 335, 336, 337, and 338 and the connection patterns 231, 232, and 233 of the first sheet 200. Also, a plurality of through-holes 341 and 342 for exposing the through-holes 250a and 250b of the first sheet 200 and the plurality of withdrawal patterns 220 and 240 are defined in the second sheet 300. That is, two through-holes 341a and 341b are defined at positions corresponding to the through holes 250a and 250b of the first sheet 200 to expose the electrode patterns 110a and 110b of the piezoelectric device 100, respectively. Also, fourth through-holes 342 are defined to expose the plurality of withdrawal patterns, i.e., four withdrawal patterns of the first sheet 200, respectively. The second sheet 300 may be formed of a material different from that of the first sheet 200. For example, the second sheet 300 may be formed of nonmagnetic ceramic. That is, the second sheet 300 may be formed of low temperature co-fired ceramic (LTCC).

The vibration transfer plate 400 may be spaced a predetermined distance from at least one surface of the second sheet 300. For example, edges of the vibration transfer plate 400 may adhere to two sides surfaces facing each other of at least the piezoelectric device 100, and the rest area of the vibration transfer plate 400 may be spaced apart from the second sheet 300. That is, the vibration transfer plate 400 may contact the side surfaces of the piezoelectric device 100. In detail, the vibration transfer plate 400 may contact side surfaces of the stacked structure in which the piezoelectric device 100 and the first and second sheets 200 and 300 are stacked. Here, the vibration transfer plate 400 may have a shape that is gradually away from the second sheet 300 toward a central portion of the second sheet 300 from edges of the second sheets 300, for example, a dome shape. All of the four edges of the vibration transfer plate 400 may adhere to the side surfaces of at least the piezoelectric device 100 to form the dome shape. For this, the vibration transfer plate 400 may be disposed along the piezoelectric device 100 to have a size greater than that of the piezoelectric device 100 That is, the vibration transfer plate 400 may have a rectangular shape to match the shape of the piezoelectric device 100. Also, the vibration transfer plate 400 may have a size greater than that of the piezoelectric device 100 in consideration of a width of an area adhering to the side surfaces of at least the piezoelectric device 100 and a distance that is spaced apart from one surface of the second sheet 300. The space spaced between the second sheet 300 and the vibration transfer plate 400 may be a resonant space of the piezoelectric speaker. The vibration transfer plate 400 may transfer the vibration and resonance of the piezoelectric device 100. In addition, the vibration transfer plate 400 together with the piezoelectric device 100 may function as a piezoelectric speaker for amplifying sounds of the electronic device. Also, when a side of the vibration transfer plate 400 contacts a vibration amplification object such as a table, a box, and the like, the output and sound pressure may be further amplified to output the amplified output and sound pressure. Here, the vibration transfer plate 400 may be formed of a metal or plastic. Alternatively, materials different from each other may be stacked to form at least double structure. For example, the vibration transfer plate 400 may be formed of a resin such as PET having a flexible property. The space between the second sheet 300 and the vibration transfer plate 400 may vary according to the size of the piezoelectric device 100, an electronic device accommodation space for accommodating the complex device module, and desired output and sound pressure.

The antenna patterns 210, 310, and 320, the withdrawal patterns 220 and 240, and the connection patterns 231, 232, and 233 may be formed of a copper film or conductive paste. In case of the conductive paste, the conductive paste may be printed on the sheet by using various printing methods. Conductive particles of the conductive paste may include metal particles of Au, Ag, Ni, Cu, Pd, Ag-coated Cu, Ag-coated Ni, Ni-coated Cu, and Ni-coated graphite, carbon nano tube, carbon black, graphite, and Ag-coated graphite. The conductive paste may be a material that is uniformly dispersed in organic binder having fluidity. The conductive paste may be applied to the sheet by using a method such as printing and then be thermally treated, such as drying, curing, and plasticizing. Thus, the conductive paste may have electrical conductivity. Also, the printing method may include lithographic printing such as screen printing, roll-to-roll printing such as gravure printing, and inject printing.

As described above, the complex device module in accordance with an exemplary embodiment may be manufactured by integrating the piezoelectric speaker, the WPC antenna, and the NFC antenna. Thus, the sound of the electronic device may be amplified by using one module. Also, the electronic device may be wirelessly charged and be capable of performing near field communication. Also, since multifunction is realized by using the one module, acquired area for the multifunction may be reduced when compared to a structure in which each function is individually provided.

The complex device module in accordance with an exemplary embodiment may have various shapes. Hereinafter, modified examples of the complex device module will be described with reference to FIGS. 4 to 6.

Figure 4:
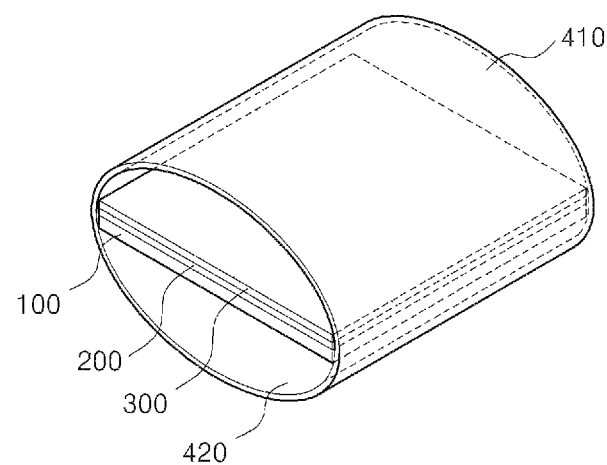
FIGS. 4 to 6 are schematic views illustrating modified examples of the complex device module in accordance with an exemplary embodiment.

As illustrated in FIG. 4, the complex device module includes the piezoelectric device 100, a first vibration transfer plate 410 serving as a dome-shaped vibration transfer body and spaced apart from a top surface of the stacked structure, in which the first and second sheets 200 and 300 stacked, from the two side surfaces of the stacked structure, and a second vibration transfer plate 420 serving as a dome-shaped vibration transfer body and spaced apart from a bottom surface of the stacked structure from the two side surfaces of the stacked structure. That is, the complex device module in accordance with an exemplary embodiment may include the piezoelectric device 100 and the first and second vibration transfer plates 410 and 420 that are respectively spaced a predetermined distance from the top and bottom surfaces of the stacked structure of the first and second sheets 200 and 300. Here, the first and second vibration transfer plates 410 and 420 may adhere to the same side surface of the stacked structure or adhere to different side surfaces of the stacked structure. That is, an edge of the second vibration transfer plate 420 may adhere to two side surfaces that are perpendicular to two side surfaces of the stacked structure to which the first vibration transfer plate 410 adheres. Alternatively, the edges of the first and second vibration transfer plates 410 and 420 may adhere to all side surfaces of the stacked structure.

Figure 5:
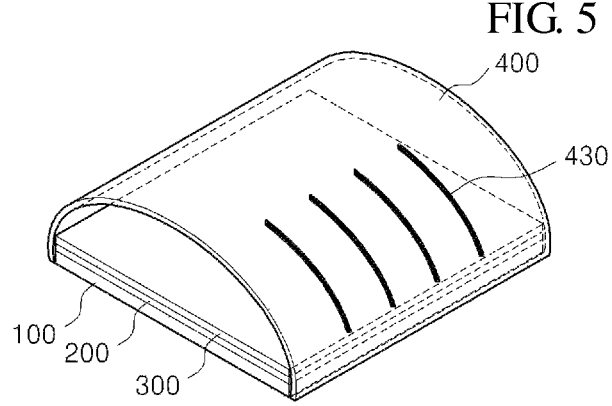

As illustrated in FIG. 5, the complex device module may include the piezoelectric device 100, a vibration transfer plate 400 having a dome shape and spaced from the top surface of the stacked structure from at least the two side surfaces of the stacked structure of the first and second sheets 200 and 300, and at least one pattern 430 disposed on a predetermined area of the vibration transfer plate 400. The pattern 430 may be formed by cutting or removing at least one area of the vibration transfer plate 400. Alternatively, the same material as or a material different from the vibration transfer plate 400 may adhere to the vibration transfer plate 400 to form the pattern 430. The pattern 430 may have a predetermined length upward from the area thereof that contacts the stacked structure. Also, the pattern 430 may be disposed on at least one side of the vibration transfer plate 400.

Figure 6:
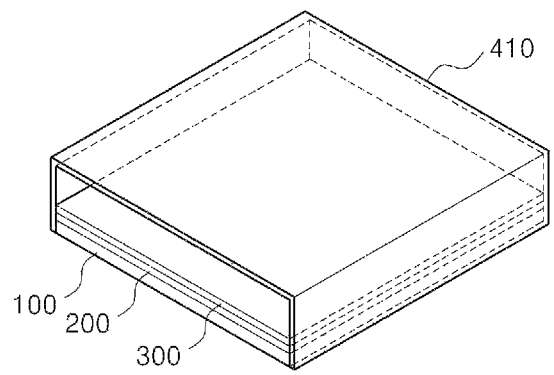

As illustrated in FIG. 6, the complex device module may include the piezoelectric device 100 and a vibration transfer plate 400 spaced from at least two side surfaces of the stacked structure of the first and second sheets 200 and 300 by the same distance as at least one surface thereof of the stacked structure. That is, although the vibration transfer plate 400 of the complex device module has the dome shape that is gradually away from the central portion from the edge on at least one surface of the stacked structure in the exemplary embodiment and modified examples, which are described with reference to FIGS. 1 to 4, the complex device module of FIG. 6 may have the same distance between the stacked structure and the vibration transfer plate 400. Although not shown, the distance between the stacked structure the vibration transfer plate 400 may gradually increase from the two edges of the stacked structure to predetermined areas, and then the remaining areas may be maintained at the same distance. As a result, in the complex device module, the vibration transfer plate 400 may be spaced a predetermined distance from at least one surface of the stacked structure. Although the edges of the vibration transfer plate 400 contact the side surfaces of the stacked structure, the edges of the vibration transfer plate 400 may contact an edge of one surface of the stacked structure.

Although the vibration transfer plate 400 is away from the two edges toward the central portion of the stacked structure in the exemplary embodiments described with reference to FIGS. 1 to 6, the vibration transfer plate 400 may be close to the central portion from the two edges of the stacked structure. Also, the distances between the stacked structure and the vibration transfer plate 400 may be different from each other on at least one area and at least the other area. That is, the vibration transfer plate 400 may have a predetermined curvature and adhere to the edges of the stacked structure.

The complex device module in accordance with an exemplary embodiment and modified example includes a vibration transfer body 400 on which the first and second sheets 200 and 300 on which the WPC antenna and the NFC antenna are disposed on the piezoelectric device 100 are stacked and co-fired, the vibration transfer body 400 being disposed on a side surface of the staked structure so that the vibration transfer body 400 is spaced apart from one surface of the stacked structure, for example, the second sheet 300. However, the complex device module may be realized in various shapes by stacking the piezoelectric device 100, the WPC antenna, and the NFC antenna. This will be described with reference to FIGS. 7 to 9.

Figure 7:
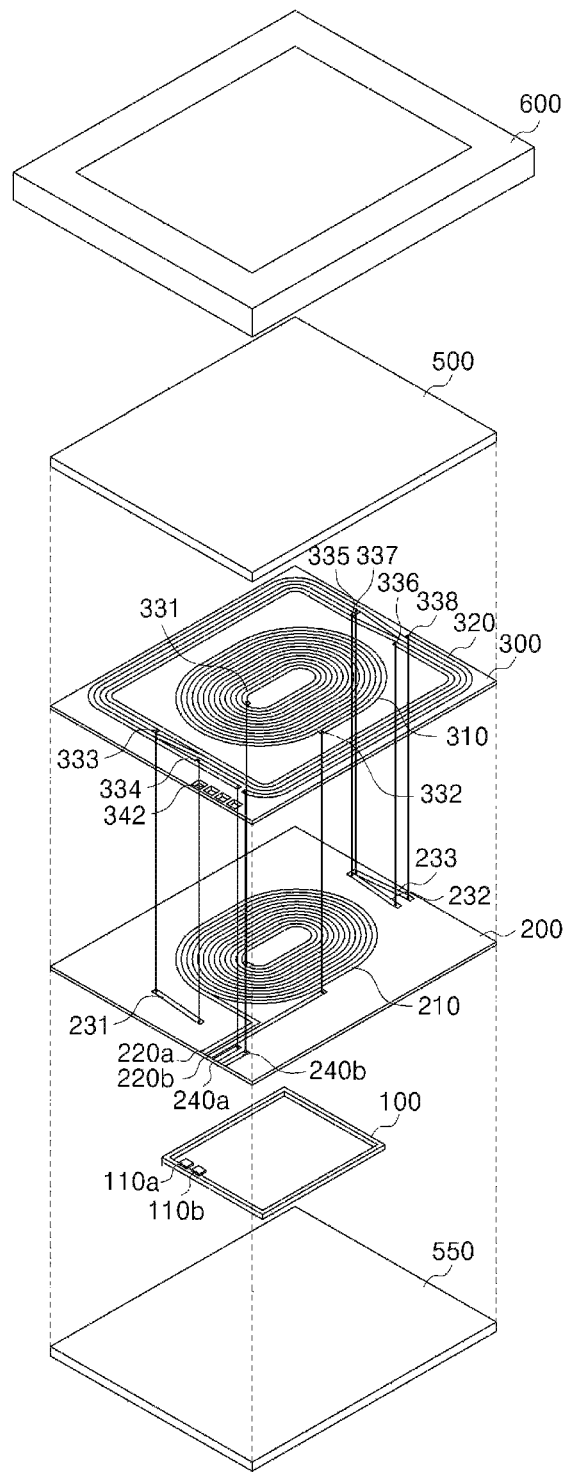
FIGS. 7 to 9 are schematic views of a complex device module in accordance with another exemplary embodiment.
Figure 8:
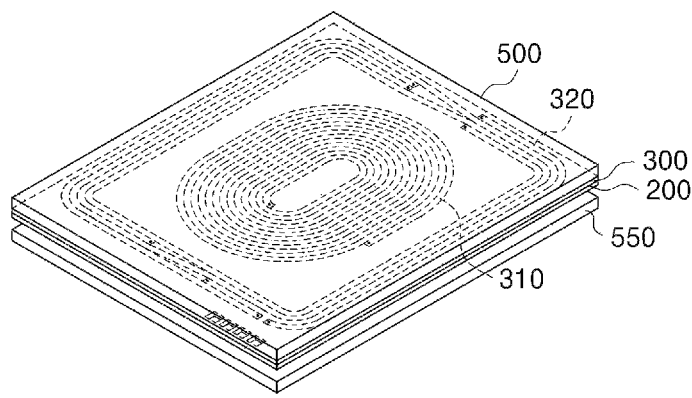
Figure 9:
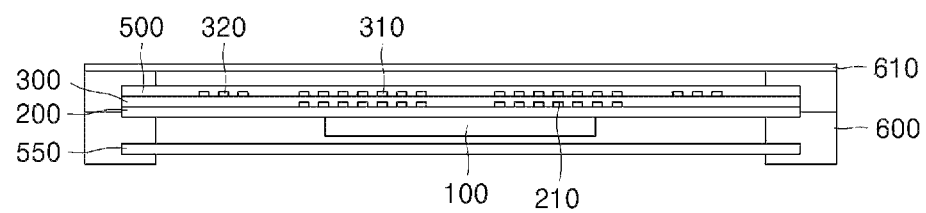

FIGS. 7 to 9 are schematic views of a complex device module in accordance with another exemplary embodiment. Here, FIG. 7 is an exploded perspective of the complex device module, FIG. 8 is a perspective view illustrating a coupled state of the complex device module, and the FIG. 9 is a cross-sectional view illustrating the coupled state of the complex device module.

Referring to FIGS. 7 to 9, a complex device module in accordance with another exemplary embodiment may include a piezoelectric device 100, a first sheet 200 disposed on one surface of the piezoelectric device 100 and having a first antenna pattern 210 and a second sheet 300 disposed on the first sheet 200 and having a second antenna pattern 310 and a third antenna pattern 320. Also, the complex device module may further include a cover sheet 500 disposed on the second sheet 300, a magnetic sheet 550 disposed under the piezoelectric device 100, and a frame 600 disposed on an edge of a stacked structure in which the first and second sheets 200 and 300 and the cover sheet 500 are stacked. Here, the piezoelectric device 100 may have a size less than that of each of the first and second sheets 200 and 300. Each of the first and second sheets 200 and 300 may be formed of a polymer material. Also, each of the first and second sheets 200 and 300 may function as a diaphragm for amplifying sounds of the piezoelectric device 100. That is, each of the first and second sheets 200 and 300 may function as a WPC antenna and NFC antenna as well as the diaphragm. Here, since contents except for the above-described contents, i.e., the shape of the pattern, the withdrawal pattern, and the connection pattern are the same as those of the foregoing embodiment, their detailed descriptions will be omitted.

Each of the first and second sheets 200 and 300 may be formed of a polymer-based or pulp-based material. For example, each of the first and second sheets 200 and 300 may be formed of a resin film. That is, each of the first and second sheets 200 and 300 may be formed of a material having a large loss coefficient with a Young's ratio of about 1 MPa to about 10 MPa such as an ethylene propylene rubber-based material and a styrene butadiene rubber-based material. As illustrated in FIG. 9, edges of the first and second sheets 200 and 300 may be fastened to the frame 600.

The cover sheet 500 is disposed on the second sheet 300 to cover second and third antenna patterns 310 and 320 disposed on the second sheet 200. The cover sheet 500 may be formed of a polymer-based or pulp-based material. For example, the cover sheet 500 may be formed of a resin film. That is, the cover sheet 500 may be formed of a material having a large loss coefficient with a Young's ratio of about 1 MPa to about 10 MPa such as an ethylene propylene rubber-based material and a styrene butadiene rubber-based material. The cover sheet 500 may be formed of the same material as the first and second sheets 200 and 300. As illustrated in FIG. 9, the cover sheet 500 may have the same size as the first and second sheets 200 and 300, and edges of the cover sheet 500 may be fastened to the frame 600. An adhesive may be disposed between the second sheet 300 and the cover sheet 500 to allow the cover sheet 500 to adhere to the second sheet 300. Also, an adhesive may be disposed between the first sheet 200 and the second sheet 300 to adhere to each other. The adhesive may include an adhesion tape using an adhesive material such as a rubber-based material, an acrylic-based material, and a silicon-based material. When the adhesion tape is used, the adhesion tape may have the same shape and size as the cover sheet 500. Since the adhesion tape have the same size as the cover sheet 500, edges of the adhesion tape may be fastened to the frame 600 together with the cover sheet 500.

The magnetic sheet 550 may be disposed under the piezoelectric device 100 and spaced apart from the piezoelectric device 100. Here, the magnetic sheet 550 may face a side of the electronic device. Since the magnetic sheet 550 is provided, the magnetic sheet 550 may shield or absorb electromagnetic waves generated from the WPC antenna and the NFC antenna to restrict an interference with the electromagnetic waves.

The frame 600 may fasten the edges of the first and second sheets 200 and 300, the cover sheet 500, and the magnetic sheet 500 to accommodate the complex device module. Also, a cover 610 spaced a predetermined distance from a top surface of the cover sheet 500 to cover the cover sheet 500 may be further provided. That is, the frame 600 may be used alone, or the cover 610 may be disposed on the frame 600. A predetermined space is defined between the complex device module and the cover 610 by the cover 610. The space may be a vibration space for a piezoelectric speaker.

The complex device module may contact the electronic device such as smartphones. Here, one side of the piezoelectric device 100 may be in contact with a main body of the electronic device. Also, the complex device module may be separably coupled to the electronic device 10. For example, a body having the same shape as a battery cover for covering a rear surface of the electronic device 10 may be provided, and the complex device module may be coupled to a predetermined area of the body to allow the body to be mounted on the rear surface of the electronic device. Also, a predetermined groove may be defined in a predetermined area of the rear surface of the electronic device, and the complex device module may be mounted in the groove. The complex device having the above-described structure in accordance with an exemplary embodiment will be described below.

Figure 10:
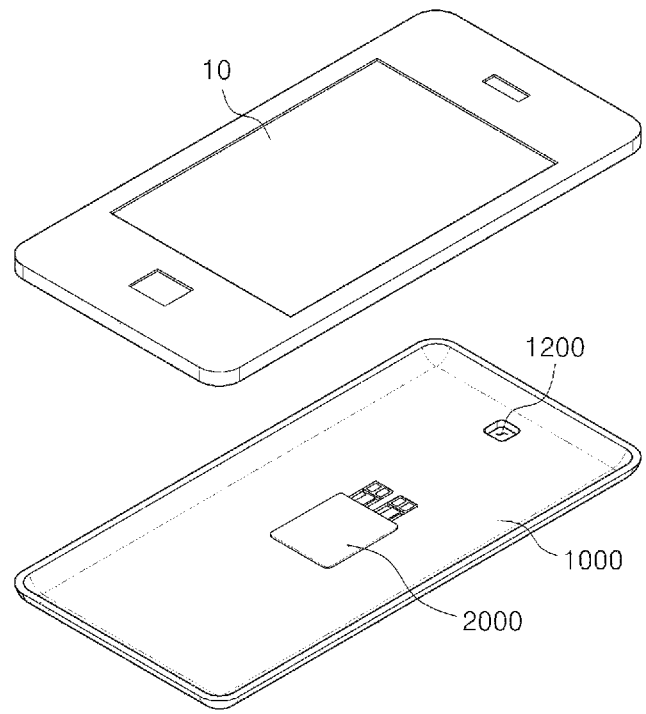
FIGS. 10 to 13 are schematic views of a complex device in accordance with an exemplary embodiment.
Figure 11:
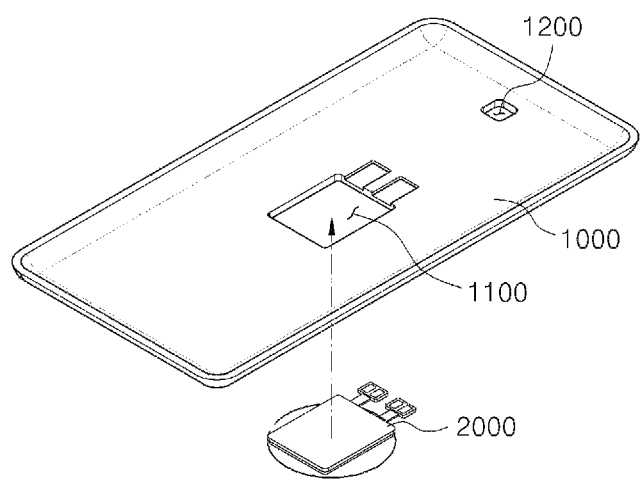
Figure 12:
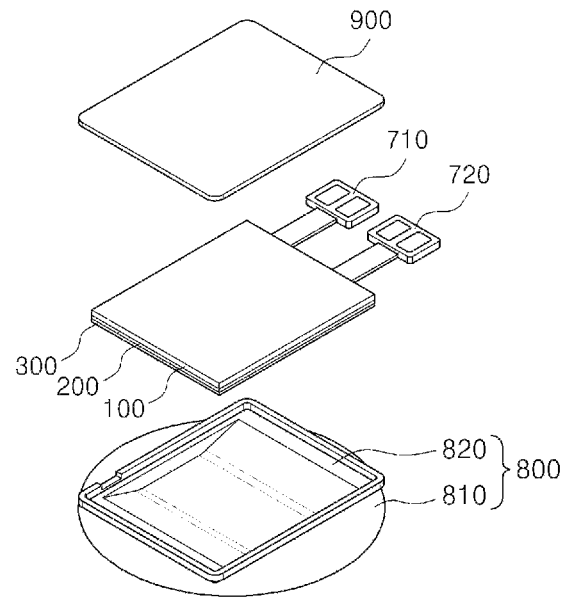
Figure 13:
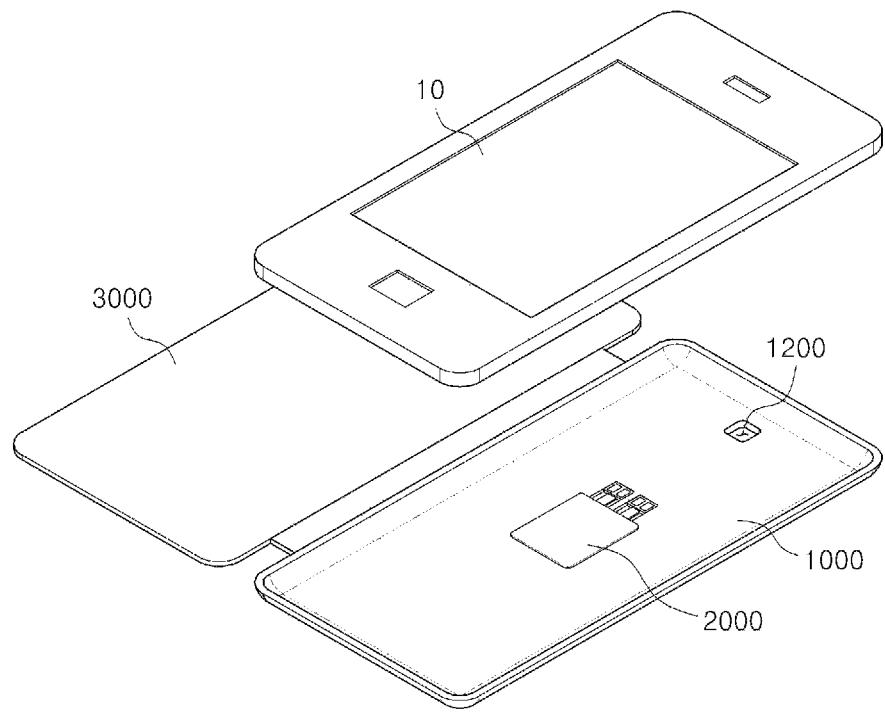
Figure 14:
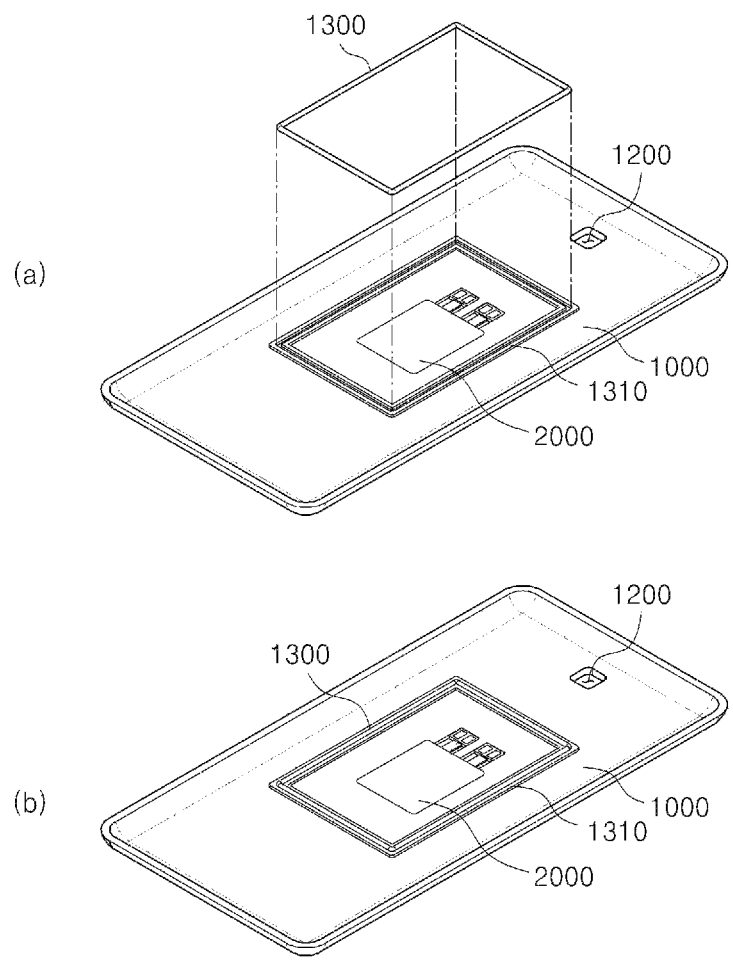
FIGS. 14 to 17 are schematic views of a complex device in accordance with another exemplary embodiment.

FIGS. 10 to 14 are schematic views of a complex device in accordance with an exemplary embodiment, i.e., schematic views of a rear cover-integrated complex device of the electronic device. That is, FIG. 10 is a front perspective view of the complex device in accordance with an exemplary embodiment, and FIG. 11 is a schematic view for explaining a coupling method between the complex device and the complex device module. Also, FIG. 12 is an exploded perspective view of the complex device module, and FIGS. 13 and 14 are schematic views illustrating modified examples of the complex device in accordance with an exemplary embodiment.

Referring to FIGS. 10 and 12, the complex device in accordance with an exemplary embodiment may include a body 1000 coupled to a rear surface of an electronic device 10 and a complex device module 2000 disposed on one area of the body 1000 and connected to the electronic device 10. The body 1000 on which the complex device module 2000 is disposed may be coupled after separating a rear cover for covering the rear surface of the electronic device 10. Alternatively, the body 1000 may be provided as a rear cover to cover the rear surface of the electronic device 10. Also, as illustrated in FIG. 13, the complex device may further include a flip cover 3000 disposed on one side surface of the body 1000 and having a size that is enough to cover a front surface of the electronic device 10 to cover the front surface of the electronic device 10.

The electronic device 10 to which the present disclosure is applied may include a portable terminal such as Tablet PCs, smartphones, and the like. In the present embodiment, the smartphone may be described as an example. The electronic device 10 may have a rectangular shape with a predetermined thickness. A display unit, a receiving unit, a key button may be disposed on the front surface of the electronic device 10, and a circuit device may be provided in the electronic device 10. In the electronic device 10, a rear cover for covering a rear surface of the electronic device 10 may be separably coupled. When the rear cover is removed, a battery may be coupled to a predetermined area of the rear surface of the electronic device 10. Here, an NFC terminal and WPC terminal may be exposed, and a camera may be provided.

The body 1000 may be separably coupled to the electronic device 10. That is, the body 1000 may have the same shape as the rear cover covering the rear surface of the electronic device 10. Also, the body 1000 may be portable and be coupled to the rear surface of the electronic device 10 after the rear cover is separated. Alternatively, the body 1000 itself may be provided as the rear cover. Here, the electronic device 10 may be produced in a state where the body 1000 is coupled to the rear surface of the electronic device 10. To separably couple the body 1000 to the electronic device 10, at least one coupling groove (not shown) may be defined in an edge of the rear surface of the electronic device 10, and at least one coupling protrusion (not shown) may be disposed on an area of the body 1000 corresponding to the coupling groove. Thus, the coupling protrusion of the body 1000 may be inserted into the coupling groove of the electronic device 10 to allow the body 1000 to be coupled to the electronic device 10. The body 100 may be flexible so that the body 1000 is deformed, for example, bent within a predetermined range. For this, the body 1000 may be formed of polyimide (PI) or polycarbonate (PC). Alternatively, the body 1000 may be formed of a metal. The main body 1000 may be formed of the same material as the rear cover of the electronic device 10. The polyimide (PI) may be a polymer that is thermal conductive plastic and has superior mechanical strength and thermal and chemical stability. The polycarbonate (PC) may be a thermoplastic resin and have superior heat resistance, impact resistance, and optical properties, and thus, have superior processability. A first opening 1100 having a predetermined size may be defined in the body 1000. The complex device module 2000 may be inserted into the first opening 1100. A second opening 1200 may further defined in the body 1000 to allow a camera (not shown) exposed to the rear surface of the electronic device 10 to be exposed. That is, a piezoelectric speaker module 2000 may be inserted into the first opening 1100, and the camera may be exposed to the outside through the second opening 1200.

The complex device module 2000 may be inserted into the first opening 1100 of the body 1000 and then be fixed to a predetermined area of the body 1000. The complex device module 2000 may include the piezoelectric device 100 that is described with reference to FIGS. 1 to 7, a first sheet 200 on which a portion of a WPC antenna is disposed, and a second sheet 300 on which a portion of the WPC antenna and an NFC antenna are disposed. In more detail, as illustrated in FIG. 12, the complex device module 2000 may include the piezoelectric device 100, a stacked structure of the first and second sheets 200 and the 300, connection terminals 710 and 720 disposed on a predetermined area of the stacked structure, a bottom vibration transfer case 800 disposed under the stacked structure to serve as a vibration transfer body, and a top cover 900 disposed above the stacked structure. That is, the first and second sheets 200 and 300 are disposed between one surface of the piezoelectric device 100 and the bottom vibration transfer case 800, and the top cover 900 is disposed on the other surface of the piezoelectric device 100. Also, the complex device module 2000 may further include a first adhesion tape (not shown) for allowing the stacked structure including the piezoelectric device 100 to adhere to the bottom vibration transfer case 800 and a second adhesion tape (not shown) for allowing the piezoelectric device 100 to adhere to the top cover 900. Here, the bottom vibration transfer case 800 may be spaced a predetermined distance from one surface of the second sheet 300 to serve as the vibration transfer plate of the piezoelectric device 100. Here, the bottom vibration transfer case 800 may have a structure different from that of the vibration transfer plate and be distinguished in position from the top cover 900.

The connection terminals 710 and 720 may be disposed on a predetermined area of the stacked structure and exposed to the outside of the complex device module 2000. The connection terminal 710 may connect the piezoelectric device 100 to the electronic device 10, and the connection terminal 720 may connect the WPC antenna and the NFC antenna to the electronic device 10. That is, the connection terminal 710 may be connected to an output terminal of the electronic device 10 to supply a predetermined power and sound source into the piezoelectric device 100, and the connection terminal 720 may be connected to an NFC terminal (not shown) and WPC terminal (not shown) which are exposed to the rear surface of the electronic device 10. Thus, the piezoelectric speaker may operate by receiving the power and sound source from the electronic device 10 through the connection terminal 710. Also, the electronic device 10 may be charged by using the WPC antenna through the connection terminal 710 and be connected to the NFC terminal to perform near field communication. For example, the connection terminals 710 and 720 may be manufactured by using a flexible printed circuit board (FPCB). The connection terminal 700 may be closely attached and fixed to a predetermined area of the body 1000 that is exposed to the outside of the complex device module 2000. Here, an accommodation groove may be defined in one area of the body 1000, and each of the connection terminals 710 and 720 may adhere and be fixed to the accommodation groove.

The bottom vibration transfer case 800 may accommodate the stacked structure including the piezoelectric device 100 and be inserted into and coupled to the first opening 1100 of the body 1000. The bottom vibration transfer case 800 includes a base 810 and a coupling part 820 protruding upward from one surface of the base 810. The base 810 may have a size greater than that of the first opening 1100 of the body 1000 and be exposed to the rear surface of the body 1000. Thus, the base 810 may be disposed on the rear surface of the body 1000 to protrude from the rear surface of the body 1000. Also, the base 810 may have various shapes such as a rectangular shape, a circular shape, a polygonal shape, and the like. For example, as illustrated in FIG. 12, the base 810 may have a long oval shape. The base 810 may be formed of the same material as the body 1000. Also, the base 810 may have a flat inner surface or an inner surface with a predetermined curvature. That is, the inner surface facing the second sheet 300 of the base 810 may be spaced a predetermined distance from the second sheet 300. Also, the inner surface of the base 810 may have a predetermined curvature so that the spaced distance between the inner surface and the second sheet 300 gradually increases from an edge toward a central portion of the inner surface. The coupling part 820 may protrude in a predetermined shape from the base 810 to accommodate the stacked structure. For this, the coupling part 820 may have the same shape as the stacked structure and protrude upward from the base 810. Thus, a side surface of the stacked structure may fixedly contact an inner surface of the coupling part 820. Also, the bottom vibration transfer case 800 may include a stepped part that is higher than the base 810 inside the coupling part 820. For example, the stepped part may be disposed at a height that is lower than that of a side surface inside the two side surfaces facing each other, and the edge of the stacked structure may adhere to the stepped part through the first adhesion tape. Also, since the stacked structure is disposed on the stepped part, a predetermined space is defined between one surface of the stacked structure and the bottom vibration transfer case 800 facing the one surface of the stacked structure, i.e., an inner plane of the base 810.

The top cover 900 may protect the stacked structure against a physical force applied from the outside and cover one surface of the piezoelectric device 100. That is, the top cover 900 may adhere to an edge of one surface of the piezoelectric device 100 by using the second adhesion tape. The top cover 900 may be manufactured by using a thin plate that is not easily bent due to high strength and hardness thereof. For example, the top cover 900 may be formed of stainless steel. Also, in the case where the top cover 900 contacts one surface of the piezoelectric device 100, when the piezoelectric device 100 is vibrated, the piezoelectric device 100 may collide with the top cover 900 to transfer the vibration of the piezoelectric device 100 into the electronic device 10 through the top cover 900. Thus, the vibration of the piezoelectric device 100 may be reduced. To prevent this phenomenon, a cushion (not shown) may be disposed between the piezoelectric device 100 and the top cover 900. That is, the cushion may be disposed on two edges of the piezoelectric device 100 to maintain a predetermined distance between the top cover 900 and the piezoelectric device 100.

As illustrated in FIG. 14, a cushion 1300 surrounding the complex device module 2000 may be disposed on an inner surface of the body 1000. Since the cushion 1300 is provided, a volume space of the complex device module 2000 may be provided to reduce noises of the electronic device 10 due to the vibration of the complex device module 2000. Here, the cushion 1300 may be formed of, for example, a silicon material. Also, the cushion 1300 may have various shapes such as a circular shape and a rectangular shape to surround the complex device module 2000. Also, the cushion 1300 may be attached to the body 1000 and be inserted into a predetermined accommodation space 1310 defined in the body 1000. That is, first and second partition walls having a predetermined distance therebetween to surround the complex device module 2000. Here, the cushion 1300 may be inserted between the first and second partition walls. Here, the cushion 1300 may contact the rear surface of the electronic device 10. If the cushion 1300 has a too high height, the body 1000 may not be coupled to the electronic device 10. Thus, the cushion 1300 may have a height at which the body 1000 is capable of being coupled to the electronic device 10.

Figure 15:
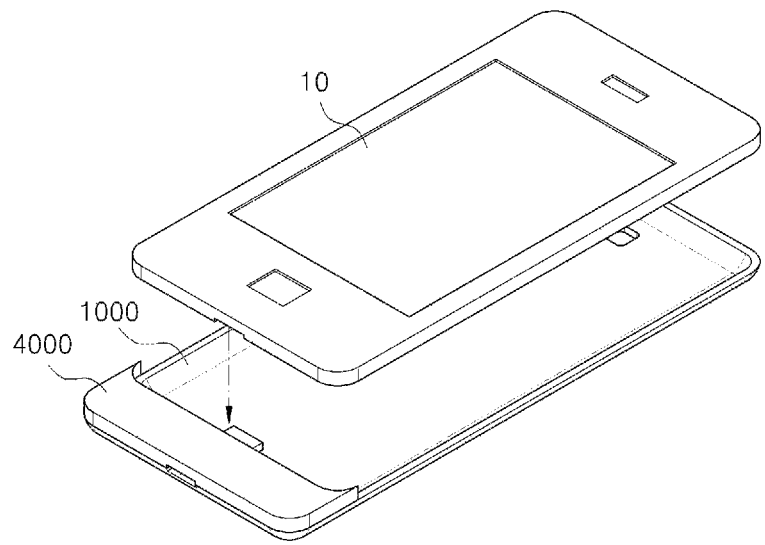
Figure 16:
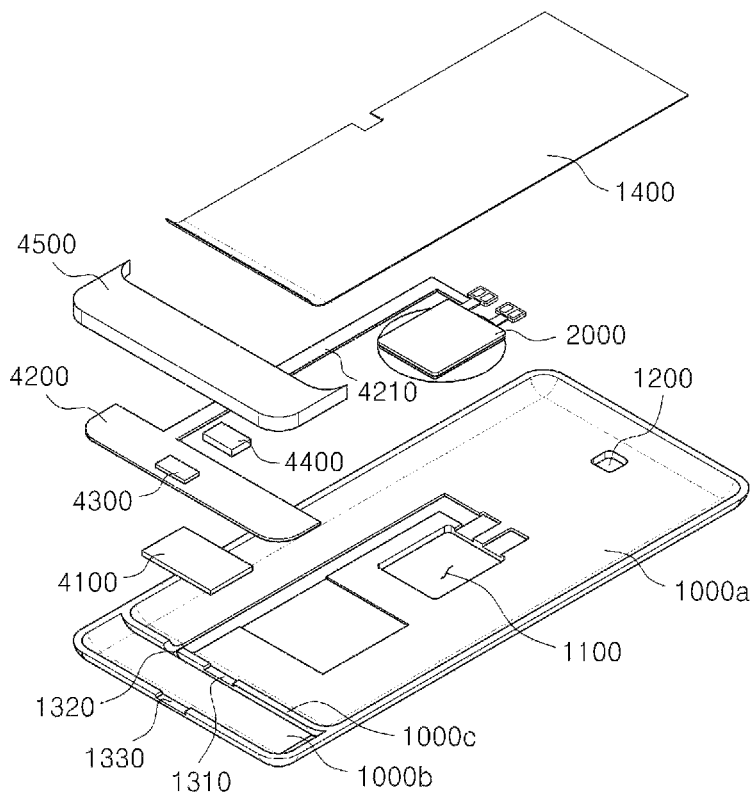
Figure 17:
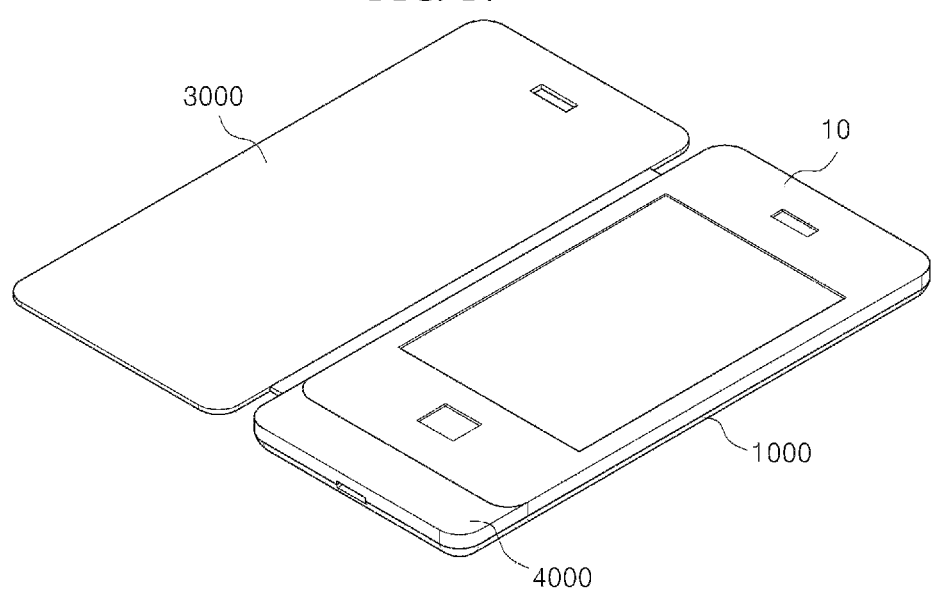

FIGS. 15 to 17 are schematic views of a portable piezoelectric speaker in accordance with another exemplary embodiment; That is, FIGS. 15 and 16 schematic and exploded perspective views of a portable piezoelectric speaker in accordance with another exemplary embodiment, and FIG. 17 is a schematic view illustrating a modified example of the portable piezoelectric speaker.

Referring to FIGS. 15 and 16, a portable piezoelectric speaker in accordance with another exemplary embodiment may include a body 1000 coupled to a rear surface of an electronic device 10, a complex device module 2000 disposed on one area of the body 1000 and connected to the electronic device 10, and a power supply part 4000 disposed on one area of the body 100 to supply a power into the complex device module 2000. Also, as illustrated in FIG. 17, the portable piezoelectric speaker may further include a flip cover 3000 covering a front surface of the electronic device 10 from the one side surface of the body 1000.

The body may include a first area 1000a corresponding to a rear surface of the electronic device 10 and a second area 1000b disposed under the first area 1000a and on which the power supply part 4000 is disposed. That is, the first area 1000a of the body 1000 may have the same size as the electronic device 10 and thus be coupled to the rear surface of the electronic device 10. Also, the second area 1000b may be further disposed under the first area 1000a corresponding to a lower side of the electronic device 10. Here, the electronic device 10 may be coupled toe the first area 1000a of the body 1000 in a state where the rear cover is removed. That is, like the foregoing embodiment, the rear cover of the electronic device 10 is removed, and then, the body 1000 is coupled to the rear surface of the electronic device 10. Also, an intermediate wall 1000c that is higher than a bottom surface of the body 1000 may be disposed between the first area 1000a and the second area 1000b. The intermediate wall 1000c may have a height corresponding to a lower portion of the electronic device 10 on which a connector is disposed. That is, a plurality of coupling protrusions (not shown) may be disposed on edges of the first area 1000a of the body 1000. Each of the plurality of coupling protrusions may be inserted into and coupled to a coupling groove (not shown) of the electronic device 10. Also, the intermediate wall 1000c may have the same height as a lower surface of the electronic device 10 to contact the lower surface. Here, a central portion of the intermediate wall 1000c corresponding to the connector of the electronic device 10 is removed by a size corresponding to that of the connector to form a first groove 1310 in the intermediate wall 1000c. Also, a predetermined area of the intermediate wall 1000c that is spaced apart from a central portion thereof in one direction may be removed to form a second groove 1320 in the intermediate wall 1000c. A first opening 1100 having a predetermined size is defined in the first area 1000a of the body 100, and the piezoelectric speaker module 2000 is inserted into the first opening 1100. Also, a space for mounting a DMB antenna, Bluetooth antenna, and the like may be defined in a predetermined area of the first area 1000a of the body 1000, for example, under the first opening 1100 in which the speaker module 2000 is inserted. The space for mounting the antennas may correspond to a space for mounting the battery of the electronic device 10. An upper cover 1400 attached to the first area 1000a to cover the first area 1000a may be provided. That is, the complex device module 2000 and the antennas may be disposed on the first area 1000a of the body 1000 and then be exposed to the outside. Here, the upper cover 1400 may cover the complex device module 2000 and the antennas to prevent the complex device module 2000 and the antennas from being exposed to the outside. The upper cover 140 may have a size corresponding to that of at least the first area 1000a.

The power supply part 4000 may be disposed on one area of the body 1000 corresponding to the lower side of the electronic device 10. That is, the power supply part 4000 may be disposed on the second area 1000b extending from the first area 1000a of the body. The power supply part 4000 may supply a power into the complex device module 2000, i.e., the piezoelectric speaker. That is, the power supply part 4000 may generate and supply a power required for operating the piezoelectric speaker. The power supply part 4000 may be connected to an external power supply terminal or data supply terminal. Also, the power supply part 4000 may be connected to the electronic device 10. That is, the external power supply terminal or data supply terminal may be connected to one side of the power supply part 4000, and the electronic device 10 may be connected to the other side of the power supply part 4000. The power supply part 4000 may include a battery 4100, a circuit board 4200, first and second connectors 4300 and 4400, and a lower cover 4500. The battery 4100 may be charged by the power supplied through the power supply terminal connected to the first connector 4300. The circuit board 4200 may have an upper portion on which the first and second connectors 4300 and 4400 are disposed and a lower portion connected to the battery 4100. Also, the first connector 4300 may be connected to the external power supply terminal or data supply terminal, and the second connector 4400 may be connected to the electronic device 10. The power supply part 4000 will now be described in more detail. A portion of the second area 1000b corresponding to the first groove 1310 of the intermediate wall 1000c may be reduced to form a third groove 1330. The first connector 4300 may be disposed to correspond to the third groove 1330, and the second connector 4400 may be disposed to correspond to the first groove 1310. Here, the first connector 4300 may be buried into the power supply part 4000 so that the first connector 4300 is not exposed to the outside. The second connector 4400 may be exposed to the first area 1000a. That is, the battery 4100, the circuit board 4200, the first and second connectors 4300 and 4400 are disposed on the second area 1000b. When the lower cover coves an upper side of the second area 1000b, the groove in which the first connector 4300 is buried may be exposed to the lower side of the power supply part 400, and the second connector 4400 protrudes to an upper side of the power supply part 4000. Also, the first connector 4300 may have a size that is enough to allow the power supply terminal or data supply terminal to be inserted therein. The second connector 4400 may have a size that is enough to allow the connector of the electronic device 10 to be inserted therein. That is, the power supply terminal or data supply terminal is inserted into the first connector 4300, and the second connector 4400 is inserted into the connector of the electronic device 10. The first and second connectors 4300 and 4400 are connected to the circuit board 4200 that is disposed thereunder. Also, the battery 4100 may be disposed under the circuit board 4200, and a connection line 4210 may extend from one area of the circuit board 4200. Thus, the circuit board 4200 may charge the battery 4100 by using the power supplied through the first connector 4200. Also, a power of the battery 4100 may be supplied into the piezoelectric speaker module 2000 through the connection line 4210. Here, a power amplification circuit may be disposed on the circuit board 4200 to amplify the power supplied into the piezoelectric speaker. That is, the piezoelectric speaker may operate at a power that is higher than a driving power of the electronic device 10. Here, the power supply part 4000 may generate and supply the driving power of the piezoelectric speaker. Also, the connection line 4210 disposed on the one side of the circuit board 4200 is connected to the piezoelectric speaker module 2000 disposed on the first area 1000a through the second groove 1320 of the intermediate wall 100c. Since the second connector 4400 is connected to the electronic device, a power or data may be supplied into the electronic device 10 through the first and second connectors 4300 and 4400. Thus, the sound may be amplified by using the portable piezoelectric speaker to charge the electronic device 10. Here, when the electronic device 10 is charged, the battery 4100 of the power supply part 4000 may also be charged. Thus, the piezoelectric speaker may operate by the battery 4100.

The body 1000 to which the complex device 200 in the exemplary embodiments is coupled may contact the rear surface of the electronic device 10 to primarily amplify the sound outputted from the electronic device 10. Then, the electronic device 10 to which the body 1000 is coupled may contact a predetermined object to secondarily amplify the primarily amplified sound. To amplify the sound of the electronic device 10, a sound amplification box having a predetermined shape may be used. The sound amplification box will be described with reference to FIGS. 18 to 21.

Figure 18:
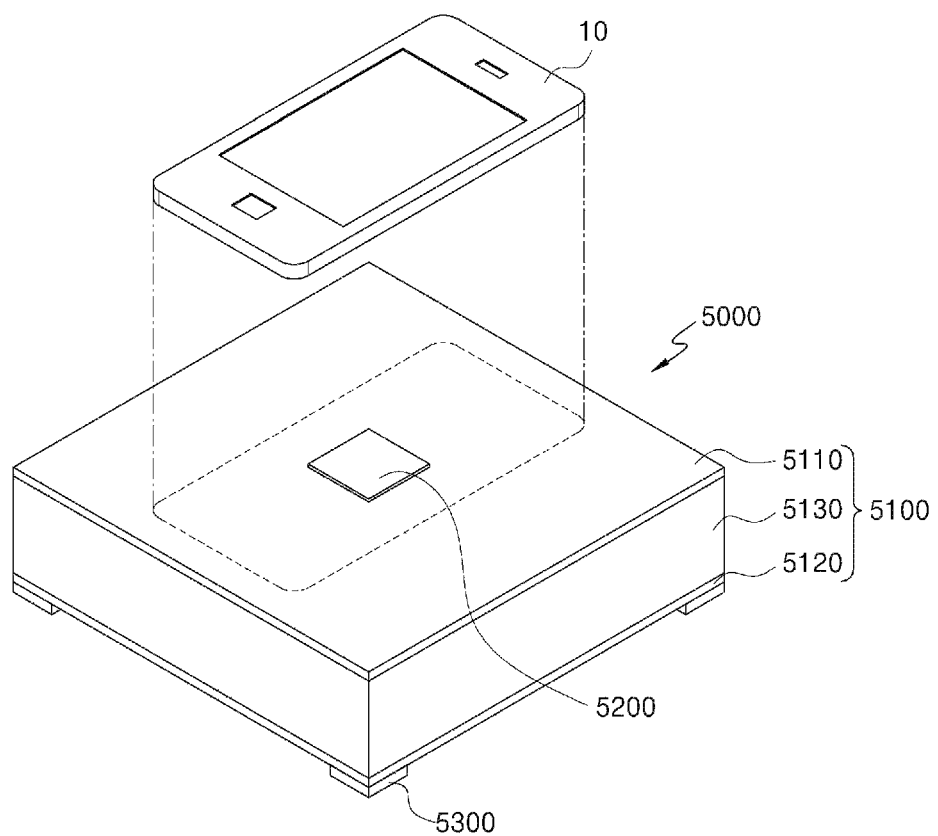
FIGS. 18 to 20 are schematic views of a sound amplification box in accordance with an exemplary embodiment.
Figure 19:
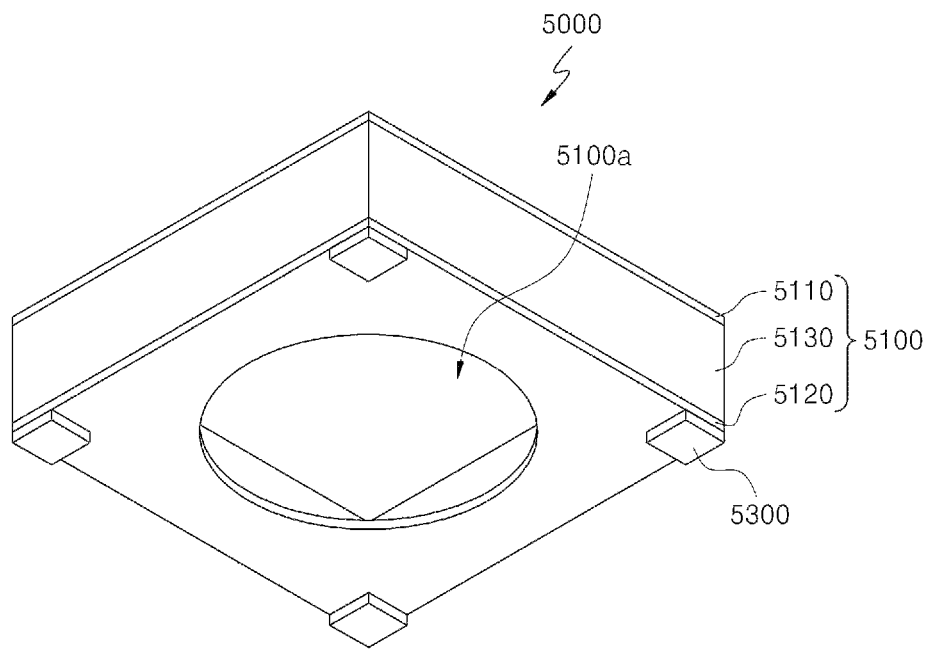
Figure 20:
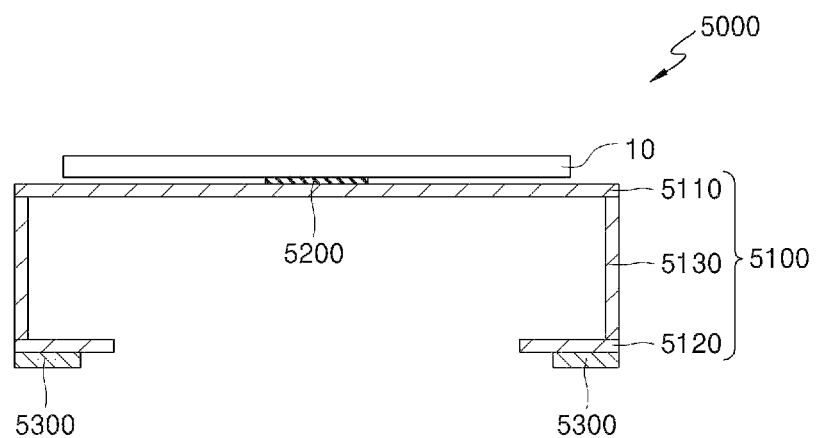
Figure 21:
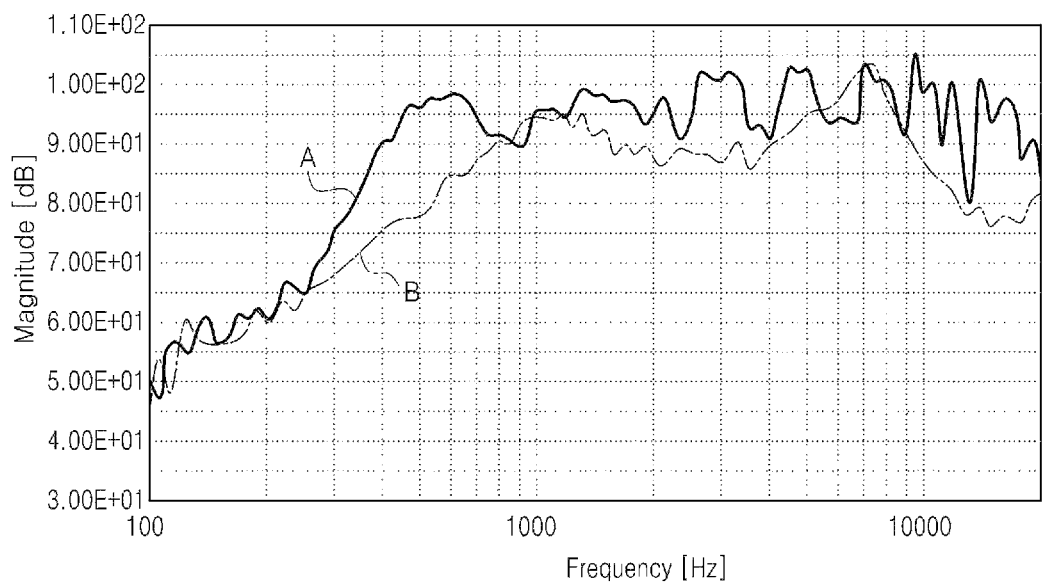
FIG. 21 is a graph illustrating data measured by using the sound amplification box in accordance with an exemplary embodiment.

FIG. 18 is a perspective view of the sound amplification box, FIG. 19 is a rear view of the sound amplification box, and FIG. 20 is a cross-sectional view of the sound amplification box. FIG. 21 is a graph illustrating a result obtained by comparing a frequency characteristic using the sound amplification box to a frequency characteristic of a dynamic speaker.

Referring to FIGS. 18 to 20, the sound amplification box 5000 may include a body 5100 having a predetermined space therein. Also, the sound amplification box 5000 may further include a vibration transfer part 5200 disposed on one surface of the body 5100 and a support part 5300 disposed on the other surface of the body 5100. That is, the sound amplification box 5000 in accordance with an exemplary embodiment may be constituted by only the body 5100 having the inner space without providing the vibration transfer part 5200 and the support part 5300.

The body 5100 includes upper and lower plates 5110 and 5120 each of which has an approximately rectangular shape and a plurality of sidewall plates 5130 having an approximately rectangular shape and disposed on edges between the upper and lower plates 5110 and 5120. That is, the upper and lower plates 5110 and 5120 are disposed to face each other. Also, four sidewall plates 5130 may be respectively disposed on edges between the upper and lower plates 5110 and 5120. Thus, the body 5100 may have an approximately hexahedron shape. The upper plate 5110 may be defined as a surface on which the electronic device 10 including a portable terminal such as a smartphone is seated, and the lower plate 5120 may be defined as a surface facing the upper plate 5110 to face the ground. Here, the upper plate 5110 may have a size greater than that of the electronic device 10. Thus, one surface of the electronic device 10 may contact a top surface of the upper plate 5110 and be seated on the top surface. Also, the lower plate 5120 may have the same size and shape as the upper plate 5110. Since the body 5100 has the approximately hexahedron shape, a predetermined resonant space may be defined in the body 5100. Alternatively, the body 5100 may have various solid structures such as a cylindrical shape, a polyhedron shape, and the like. For example, each of the upper and lower plates 5110 and 5120 may have a circular shape, and the sidewall plates 5130 may be disposed on the edges between the upper and lower plates 5110 and 5120 in a band shape. Thus, the body 5100 may have a cylindrical shape. Also, a resonant hole 5100a having a predetermined size may be defined in a predetermined area of the lower plate 5120. Since the resonant hole 5100a is provided, air within the body 5100 may be discharged to the outside. Thus, even though the electronic device 10 has a low output, the sound may be sufficiently amplified. As a result, a low-pitched sound may be clearly heard. For example, the resonant hole 5100a may have a circular shape, but the present disclosure is not limited to the shape of the resonant hole 5100a. That is, the resonant hole 5100a may have a polygonal shape such as an oval shape, a square shape, pentagonal shape, and the like. Also, at least one resonant hole 5100a may be provided. For example, one resonant hole 5100a may be defined in a central area of the lower plate 5120, and at least two resonant holes 5100a may be defined in at least two areas of the lower plate 5120. Also, at least one resonant hole 5100a may be defined in at least one sidewall plates 5130 as wall as the lower plate 5120. Here, the resonant hole 5100a may have a size that is adjustable according to a volume of the body 5100 and the amplified degree of the sound. For example, when the resonant hole 5100a is defined in the lower plate 5120, the resonant hole 5100a may have an area of about 10% to about 80% of the total area of the lower plate 5120. Here, the more the resonant hole 5100a decreases in area, the more a frequency band to be amplified decreases. On the other hand, the more the resonant hole 5100a increases in area, the more the frequency band to be amplified increases. For example, when the resonant hole 5100a having a first surface area is provided, a frequency of about 1 KHz to about 1.5 KHz may be amplified. When the resonant hole 5100a having a second surface area greater than the first surface area is provided, a frequency of about 800 Hz to about 2 KHz may be amplified. Also, when the resonant hole 5100a increases in surface area, a sound pressure may relatively less increase. That is, when the resonant hole 5100a having the second surface area greater than the first surface area is provided, the sound pressure may relatively increase when compared to the resonant hole 5100a having the first surface area. The body 5100 may be formed of a material that is hard and has superior vibration transfer properties. However, if the body 5100 is too light, the body 5100 may be excessively vibrated, and thus the sound may be unclear. On the other hand, if the body 5100 is too hard and heavy, an unnatural sound may be outputted. Thus, the material of the body may be selected in consideration of the volume of the body 5100. In the same volume, the body 5100 may be formed of a relatively heavy material. For example, the body 5100 may be formed of hardwood, glued-laminated timber, pulp, paper, medium density fiberboard (MDF), metal, plastic, and the like.

The vibration transfer part 5200 may be disposed on a predetermined area on the upper plate 5110 of the body 5100. For example, the vibration transfer part 5200 may contact the electronic device 10 disposed on a central portion of the upper plate 5110. The vibration transfer part 5200 may be formed of a material different from that of the body 5100 to transfer the vibration outputted from the electronic device 10 into the vibration space within the body 5100. Of cause, even though the vibration transfer part 5200 is not provided, the sound of the electronic device 10, i.e., the vibration may be transferred into the body 5100. However, since the vibration transfer part 5200 is provided, vibration transfer efficiency may be more improved. Also, since the vibration transfer part 5200 is provided, secondary noises may be reduced, and also, the electronic device 10 may be fixed. To realize the above-described properties, the vibration transfer part 5200 may be formed of, for example, silicon having high elasticity, ethylene-vinyl acetate copolymer (EVA), or the like. Thus, the adhesion force of the electronic device 10 may be improved to effectively transfer the vibration of the electronic device 10 into the body 5100. In addition, the sliding of the body 5100 may be reduced to stably mount the electronic device 10. The vibration transfer part 5200 may have a surface disposed at a height that is higher than that of the upper plate 5110 of the body 5100. That is, the vibration transfer part 5200 may be disposed on a top surface of the upper plate 5100 to protrude from the upper plate 5110. Alternatively, the upper plate 5110 may a groove having a predetermined depth, and the vibration transfer part 5200 may be buried into the groove.

The support part may be disposed on a predetermined area of the lower plate 5120. For example, the support part 5300 may be disposed on each of four corners of the lower plate 5120. That is, the support part 5300 may be disposed inside the areas contacting the sidewall plates 5130. Since the support part 5300 is provided, the lower plate 5120 may not contact the ground. That is, a space may be defined between the lower plate 5120 and the ground by the support part 5300 to allow air to smoothly flow through the resonant hole 5100a and also to provide a secondary resonant space. The support part 5300 may be formed of rubber, foam, or the like to prevent the body 5100 from being shaken or slid.

In the body 5100 of the sound amplification box 5000, at least the upper plate 5110 may be formed of a material having adequate elasticity. That is, since the upper plate 5110 directly contacts the electronic device 10 to serve as a diaphragm for transferring the vibration of the electronic device 10, the upper plate 5110 may be formed of adequate elasticity. To obtain a high output by changing the material of the upper plate 5110, high Young's ratio is required. However, to generate flat frequency characteristics, a low elastic modulus is needed. If the elastic modulus is high, the sound pressure increases. However, a specific frequency may increases (be emphasized) in output to hinder the flat frequency characteristics. Thus, to realize high sound pressure and high sound quality, the elastic modulus of the upper plate 5110 may be within an adequate range according to a transfer structure of a vibration source, i.e., the electronic device 10. Also, the upper plate 5110 may have light mass due to smooth vibration. However, if the upper plate 5110 decreases in mass, the resonant frequency may increase to deteriorate sound quality. Thus, a specific elastic modules (=elastic modules/density) may be adjusted to manufacture the upper plate 5110 having an optimal combination of the speaker efficiency and resonant frequency. Also, the sound amplification box may contact the electronic device 10 including a contact-type speaker to amplify the sound. Thus, the upper plate 5110 has to be exposed by a predetermined area (ratio) in at least one side surface direction of the electronic device 10. That is, the upper plate 5110 has to have a size greater than that of the electronic device 10. To satisfy the above-described conditions, a sandwich-type plate may be used as at least the upper plate 5110. For example, the sandwich-type plate may be formed of a polymer-based material having a density of about 10.0 kg/m$^2$ to about 20.0 kg/m$^2$ and an elastic modulus of about $2500 \times 106$ N/m$^2$ to about $3500 \times 106$ N/m$^2$. To improve impedance matching properties with air, a sandwich-type plate on which a pulp having a density of about 100 kg/m$^2$ to about 300 kg/m$^2$ and an elastic modulus of about $100 \times 106$ N/m$^2$ to about $200 \times 106$ N/m$^2$ adheres to each of both surfaces thereof may be used as the upper plate 5110. For example, the upper plate 5110 may be manufactured by using a plate in which white snow adheres to each of both surfaces of polystyrene. Of cause, the lower plate 120 and the plurality of sidewall plate 5130 in addition to the upper plate 5110 may be manufactured by using the sandwich-type plate.

FIG. 21 is a graph illustrating a result obtained by comparing a frequency characteristic A using the sound amplification box to a frequency characteristic B of the dynamic speaker. Table 1 illustrates the obtained result.

TABLE 1

|  | Sound pressure (dB) | | | | |
|---|---|---|---|---|---|
|  | Resonant frequency (kHz) | 0.5 kHz (Low band) | 0.8~1.5 kHz (Mean sound pressure) | 3 kHz | 0.3~20 kHz (Mean sound pressure) |
| Sandwich type (A) | 0.63 | 96.0 | 93.3 | 99.5 | 95.3 |
| Dynamic (B) | 1.00 | 79.0 | 93.2 | 88.1 | 87.1 |

As described above, when the sound amplification box manufactured by using the sandwich-type plate is used, the resonant frequency may be reduced when compared to that of the dynamic speaker, and also, the frequency characteristic may be improved in all frequency bands when compared to that of the dynamic speaker.

In accordance with the exemplary embodiments, the piezoelectric speaker, the WPC antenna, and the NFC antenna may be integrated as one module to manufacture the multifunctional complex device. Also, the body having the same shape as the rear cover of the portable electronic device may be provided, and the complex device module in which the piezoelectric speaker, the WPC antenna, and the NFC antenna are integrated may be coupled to a predetermined area of the body.

Thus, the body of the portable complex device may be coupled to the rear surface of the electronic device to amplify the sound level of the portable electronic device by using the piezoelectric speaker, wirelessly charge the electronic device by the WPC antenna, and to perform the near field communication by using the NFC antenna.

In addition, since the multifunctional complex device is manufactured in an ultrathin shape, the complex device may decrease in volume and be easily to carry.

Although the complex device and the electronic device having the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A complex device comprising:
   a piezoelectric device;
   a wireless power charge (WPC) antenna disposed on one surface of the piezoelectric device, the WPC antenna including two antenna patterns that are vertically spaced apart from each other; and
   a near field communication (NFC) antenna disposed outside the WPC antenna,
   wherein the two antenna patterns comprise a first WPC antenna pattern disposed on a first sheet that is provided on one surface of the piezoelectric device and a second WPC antenna pattern disposed on a second sheet that is provided on the first sheet, further comprising a vibration transfer body contacting at least one area of a stacked structure in which the piezoelectric device, the WPC antenna, and the NFC antenna are stacked, the vibration transfer body being disposed to be spaced apart from one surface of the stacked structure.

2. The complex device of claim 1, further comprising:
   a first connection hole defined in the second sheet to connect the first and second WPC antenna patterns to each other; and
   a first withdrawal pattern disposed on the first sheet, the first withdrawal pattern being connected to the first WPC antenna pattern and withdrawn to the outside.

3. The complex device of claim 2, wherein the NFC antenna is disposed on the second sheet outside the second WPC antenna pattern, and at least one portion of the NFC antenna is cut.

4. The complex device of claim 3, further comprising:
   at least one connection pattern disposed on the first sheet;
   at least one second connection hole defined in the second sheet to connect the NFC antenna to the at least one connection pattern; and
   a second withdrawal pattern disposed on the first sheet, the second withdrawal pattern being connected to the NFC antenna and withdrawn to the outside.

5. The complex device of claim 4, wherein the first sheet comprises a magnetic sheet, and the second sheet comprises a nonmagnetic sheet.

6. The complex device of claim 5, wherein the piezoelectric device and the first and second sheets are co-fired.

7. The complex device of claim 4, wherein each of the first and second sheets is formed of a polymer.

8. The complex device of claim 7, further comprising a cover sheet disposed on the second sheet and a magnetic sheet spaced apart from another surface of the piezoelectric device.

9. The complex device of claim 8, further comprising:
   a frame configured to fasten an edge of the stacked structure comprising the first and second sheets; and
   a cover disposed on at least one side of the frame.

10. A complex device comprising:
    a body separably coupled to a rear surface of an electronic device; and
    a complex device module coupled to a predetermined area of the body,
    wherein the complex device module comprises:
      a piezoelectric device,
      a wireless power charge (WPC) antenna disposed on one surface of the piezoelectric device, the WPC antenna including two antenna patterns that are vertically spaced apart from each other; and
      a near field communication (NFC) antenna disposed outside the WPC antenna;
    wherein the two antenna patterns comprise a first WPC antenna pattern disposed on a first sheet that is provided on one surface of the piezoelectric device; and a second WPC antenna pattern disposed on a second sheet that is provided on the first sheet, further comprising a vibration transfer body contacting at least one area of a stacked structure in which the piezoelectric device, the WPC antenna, and the NFC antenna are stacked, the vibration transfer body being disposed to be spaced apart from one surface of the stacked structure.

11. The complex device of claim 10, wherein the WPC antenna comprises:
    a first connection hole defined in the second sheet to connect the first and second WPC antenna patterns to each other; and
    a first withdrawal pattern disposed on the first sheet, the first withdrawal pattern being connected to the first WPC antenna pattern and withdrawn to the outside.

12. The complex device of claim 11, wherein the NFC antenna comprises:
    an NFC antenna pattern disposed on the second sheet outside the second WPC antenna and of which at least one portion is cut;
    at least one connection pattern disposed on the first sheet;
    at least one second connection hole defined in the second sheet to connect the NFC antenna to the at least one connection pattern; and
    a second withdrawal pattern disposed on the first sheet, the second withdrawal pattern being connected to the NFC antenna and withdrawn to the outside.

13. The complex device of claim 12, wherein the first sheet comprises a magnetic sheet, and the second sheet comprises a nonmagnetic sheet, and
    the piezoelectric device and the first and second sheets are co-fired.

14. The complex device of claim 12, wherein each of the first and second sheets is formed of a polymer, and
the complex device further comprises a cover sheet disposed on the second sheet and a magnetic sheet spaced apart from another surface of the piezoelectric device.

15. The complex device of claim 10, wherein the body has the same shape as a rear cover of the electronic device and is coupled after the rear cover of the electronic device is separated.

16. The complex device of claim 15, wherein an opening is defined in a predetermined area of the body, and
the complex device module is inserted into the opening.

17. The complex device of claim 15, wherein the body has a predetermined area that protrudes outward to define an accommodation space therein so that the complex device module is inserted into the accommodation space.

18. The complex device of claim 15, wherein the complex device module comprises:
a first connection terminal having one side connected to the piezoelectric device and the other side exposed to the outside, the first connection terminal being connected to a sound output terminal disposed on a rear surface of the electronic device; and
a second connection terminal having one side connected to the WPC antenna and the NFC antenna and the other side exposed to the outside, the second connection terminal being connected to a WPC terminal and NFC terminal that are disposed on the rear surface of the electronic device.

19. The complex device of claim 15, further comprising a flip cover disposed on one side surface of the body to cover a front surface of the electronic device.

20. An electronic device to which a complex device module is coupled to a rear surface thereof, the electronic device comprising:
a body separably coupled to the rear surface of the electronic device; and
a complex device module coupled to a predetermined area of the body,
wherein the complex device module comprises:
a piezoelectric speaker,
a wireless power charge (WPC) antenna disposed on one surface of the piezoelectric device, the WPC antenna including two antenna patterns that are vertically spaced apart from each other; and
near field communication (NFC) antenna disposed outside the WPC antenna;
wherein the two antenna patterns comprise a first WPC antenna pattern disposed on a first sheet that is provided on one surface of the piezoelectric device; and a second WPC antenna pattern disposed on a second sheet that is provided on the first sheet, wherein the complex device module further comprises: a vibration transfer body contacting at least one area of a stacked structure in which the piezoelectric device, the WPC antenna, and the NFC antenna are stacked, the vibration transfer body being disposed to be spaced apart from one surface of the stacked structure.

21. The electronic device of claim 20, wherein the vibration transfer body is disposed away from an edge of the piezoelectric device toward a central portion thereof or is maintained at a distance with respect to the piezoelectric device.

22. The electronic device of claim 21, wherein the vibration transfer body of the complex device module contacts a vibration amplification object to amplify a sound pressure and output that are outputted from a piezoelectric speaker.

* * * * *